J. P. CLEAL.
REGISTERING AND RECORDING MACHINE.
APPLICATION FILED AUG. 21, 1908.

1,118,104.

Patented Nov. 24, 1914.
6 SHEETS—SHEET 1.

J. P. CLEAL.
REGISTERING AND RECORDING MACHINE.
APPLICATION FILED AUG. 21, 1908.

1,118,104.

Patented Nov. 24, 1914.
6 SHEETS—SHEET 2.

J. P. CLEAL.
REGISTERING AND RECORDING MACHINE.
APPLICATION FILED AUG. 21, 1908.

1,118,104.

Patented Nov. 24, 1914.
6 SHEETS—SHEET 4.

Witnesses
Carl W. Benst
C. A. Husby, Jr.

Inventor
Joseph P. Cleal
by H. Kluegg
and R. C. Class
Attorneys

J. P. CLEAL.
REGISTERING AND RECORDING MACHINE.
APPLICATION FILED AUG. 21, 1908.

1,118,104.

Patented Nov. 24, 1914.
6 SHEETS—SHEET 5.

Witnesses
Carl W. Benst
C. A. Hubig, Jr.

Inventor
Joseph P. Cleal
by
and
Attorneys

UNITED STATES PATENT OFFICE.

JOSEPH P. CLEAL, OF TORONTO, ONTARIO, CANADA, ASSIGNOR TO THE NATIONAL CASH REGISTER COMPANY, OF DAYTON, OHIO, A CORPORATION OF OHIO.

REGISTERING AND RECORDING MACHINE.

1,118,104.          Specification of Letters Patent.      Patented Nov. 24, 1914.

Application filed August 21, 1908. Serial No. 449,688.

*To all whom it may concern:*

Be it known that I, JOSEPH P. CLEAL, a citizen of the United States, residing at Toronto, in the Province of Ontario, Canada, have invented certain new and useful Improvements in Registering and Recording Machines, of which I declare the following to be a full, clear, and exact description.

This invention relates to registering and recording devices and aims to provide an improved construction wherein a plurality of records may be made as well as a summation of the amounts entered in the machine.

The invention is particularly adapted for the use of mail order houses, these establishments receiving a very large quantity of written orders, accompanied by remittances. It is therefore the main object of the present invention to provide a mechanism which will print certain data in a number of places and at the same time sum up the amount of the transaction. In the machine shown, three full records including the amount of the transaction, the date and the consecutive number are made, and two other records comprising the date and consecutive number are also made. With this system the envelop, remittance, letter, filing card and stub may be marked with the data necessary to keep a complete record of the business.

Among the further objects of the invention may be said to be the provision of a lever controlled totalizing mechanism, the addition on which takes place during the setting of the levers; and as a desirable feature of this type of device, means are provided for resetting any transfer devices which may have been actuated by a too great throw of the setting levers.

It is desirable to compel the operator of the machine to actuate a special setting lever to a position for printing his own designation, and as a further object, therefore, it is desired to provide a special lever controlling the operation of the amount levers so that operation of the amount levers is prevented until after the special or clerk's lever has been positioned.

A further object is to provide an improved mechanism whereby the operation of at least one of the amount levers is requisite before the machine may be released and completely operated.

A further object is to provide an improved turn to zero mechanism for the totalizer whereby the totalizer may be returned to normal or zero position by a preliminary adjustment of the controlling lever and an operation of the machine.

Various other subordinate objects all tending to provide improved mechanism for printing in a plurality of places on record materials and for retaining in the machine an entry of the transaction are attained by this construction.

With these and incidental objects in view, the invention consists in certain novel features of construction and combinations of parts the essential elements of which are set forth in appended claims and a preferred form of embodiment of which is hereinafter described with reference to the drawings which accompany and form part of this specification.

Of said drawings.

The present invention is designed primarily to take care of the business in so-called mail order houses, these houses receiving written orders accompanied by remittances in great numbers. To retain an adequate record of the transaction when such a large amount of material is received needs a complicated system and as a part of such a system, the present invention is intended to print the amounts received together with the date and a consecutive number for identifying the transaction on the remittance and letter and on the filing card. The envelop which incloses the remittance and letter from the customer is also stamped with the date and the same consecutive number, and a stub of the filing cards has this latter information also stamped thereon.

To attain the general object stated, the machine of the present invention includes a plurality of amount setting levers, one for each denomination necessary and a special setting lever appropriated to the operators of the machine.

The amount levers are locked in zero position until the special clerk's lever has been adjusted so as to thereby compel the operator to identify himself or to, as it were, sign his name to each transaction. The machine handle which completes the operation of the mechanism is constructed to be locked until at least one of the amount levers are positioned, thereby preventing the clerk from by inadvertance operating the machine without setting the amount levers to the desired amount. The setting levers are connected to sets of printing devices, here shown as type carrying wheels, which are arranged to print on separate pieces of record material by the elevation of a platen device common to all the sets of type carriers. The setting levers are arranged to directly actuate a totalizer as they are moved from their zero position, and it may sometimes happen that a lever may be moved past the desired position. Means are provided for resetting any transfer pawls which may have been tripped by such mistaken movement of the setting levers. At the end of each operation the setting lever and the clerk's lever are positively restored to normal zero position, but at this time the totalizer is disconnected therefrom so that no reverse operation of the totalizer takes place. It is desirable at times to restore the totalizer to zero position and mechanism for connecting its supporting shaft to the amount operating devices of the machine are provided so that the actuation of a connecting device and the operation of the main handle of the machine will reset the totalizer.

The machine as shown is of a type which is generally known in the art as a lever set, crank operated machine, that is, one whose primary setting means consists of a series of hand operated levers which are adapted to be differentially adjusted according to the amount to be registered and recorded and whose operation is completed by the operation of a crank handle. The registering or totalizing device is normally out of operative engagement with the amount determining elements and is thrown into operative engagement with said elements only by an initial movement of one of the amount setting levers. An interlocking device is provided so that the amount setting levers are locked from manipulation until the clerk's initial setting lever is manipulated. A machine lock is also provided and is so arranged that the machine will remain locked until one of the amount levers is manipulated. An actuation of the clerk's lever and of at least one amount lever before the machine may be operated is thereby compelled.

The printing device as shown consists of five sets of printing wheels together with their individual platens and inking devices. A sliding table is provided upon which the material to be printed is placed. This table is slid into the machine by the operator and trips a machine lock which is so arranged as to lock the machine from operation until said table is in its inner position. A knife is provided between the fourth and fifth printing platens for severing a duplicate slip or voucher which will be deposited in a drawer below the platen. The mechanism is arranged to separate the filing card and stub, and a gripping device is provided which will serve to convey the separated stub into a receptacle at the bottom of the machine, and thereby provide the filing of the stubs in regular order in a place such that the operator cannot remove them or in any way change the records made thereon.

Figure 1:
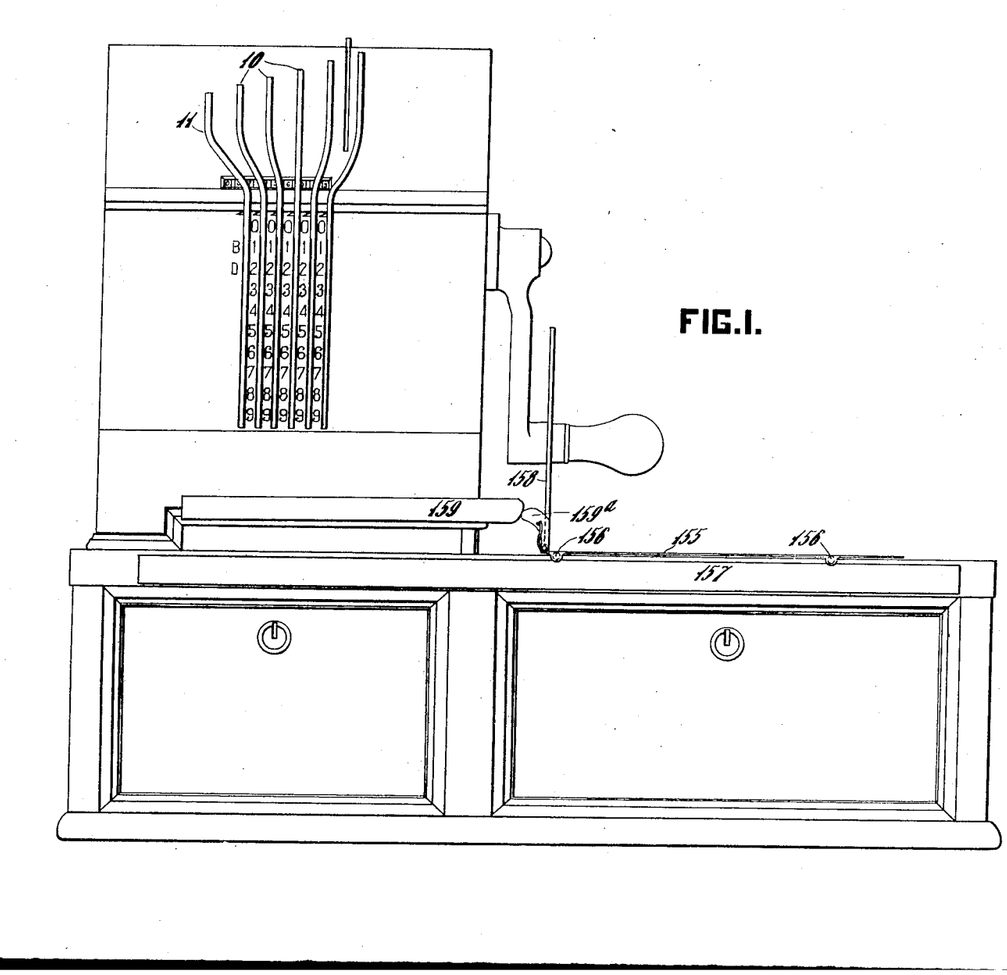
Figure 1 is a front elevation of the machine.

Referring to Fig. 1, it will be seen that there are a number of amount setting levers 10 and a clerk's initial setting lever 11. These levers are pivoted loosely upon a shaft 12 (see Figs. 2 and 4), and have securely fastened to their sides gear wheels 13 which mesh with pinions 14. These pinions mesh with rack teeth 15 of rack bars 16 which are mounted upon two cross bars 17. The under sides of the rack bars 16 are provided with gear teeth 18 which mesh with pinions 19 secured to the sides of three sets of type wheels 20. Thus it will be plain that the manipulation of the amount levers 10 will set the type wheels 20 correspondingly.

Figure 3:
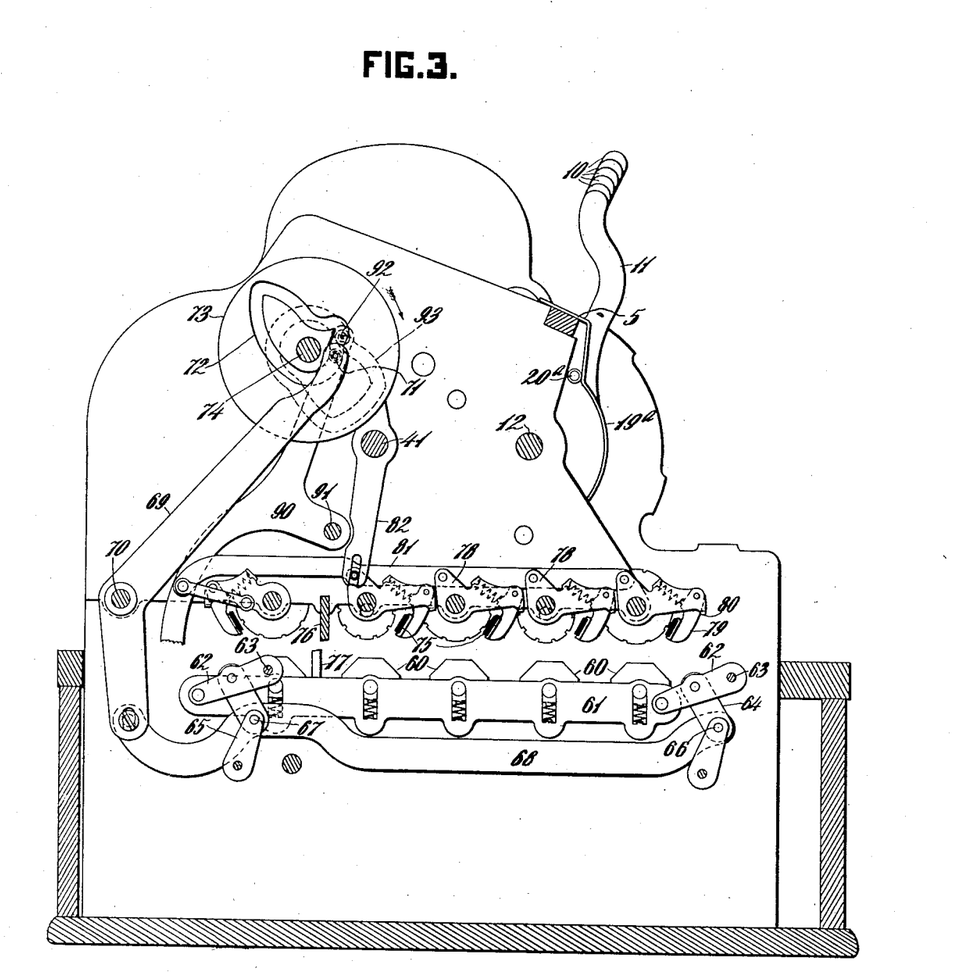
Fig. 3 is a vertical transverse section through the machine showing the platen operating and type wheel inking devices.
Figures 4, 5, 6:
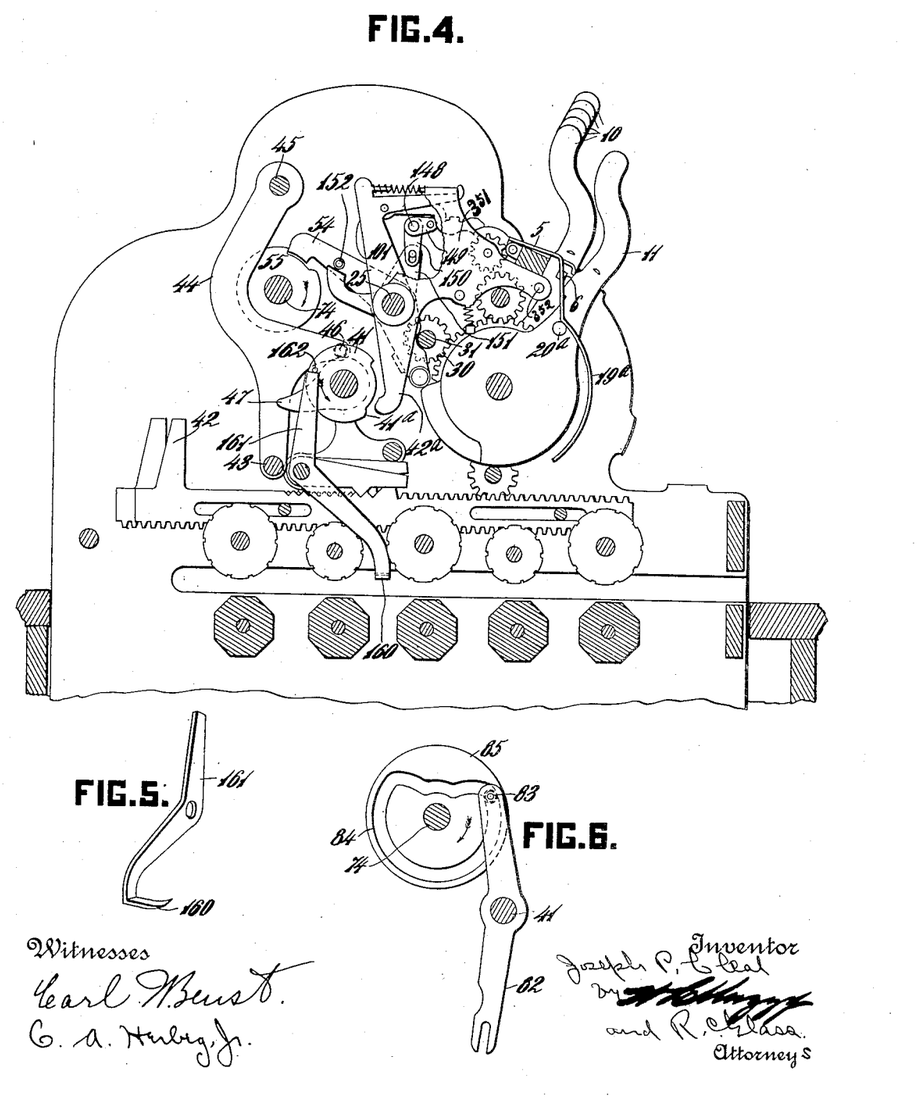
Fig. 4 is a vertical transverse section through the machine showing the initial lever in set position.
Fig. 5 is a detail perspective view of a machine locking lever.
Fig. 6 is a detail view of the operating means for the inking device.

The interlocking device between the initial lever and the amount levers consists of a pivoted frame 5 having a downwardly curved arm 19ª adapted to be engaged by a pin 20ª on the initial lever (see Fig. 3), and operated to a position shown in Fig. 4. Extending forwardly and downwardly from said frame 5 are a series of locking arms one for each amount lever, which in the normal position of said frame engage square pins 6 attached to the sides of the amount levers (see Fig. 2). As shown in this figure there is a downwardly extending arm 7 from the frame 5 between which and part of the frame work of the machine is a spring to return said frame to its normal locking position. Thus it will be clear that the initial lever must be set before any of the amount levers can be moved from their normal positions, and it will be seen from the shape of arm 19ª and the normal position of pin 20ª that a movement of one step by the initial lever will throw the arm, but that additional movement of said lever will not cause further movement of said arm.

The totalizer is normally out of gear with the operating devices, but it is thrown in gear therewith by the first movement of any one of the amount levers. To provide for this movement the totalizer is mounted in a pivoted frame arranged to be rocked by the movement of the amount levers, which movement also connects to the totalizer frame a cam arm for restoring the totalizer at the end of each operation. A specific description of the parts for moving the totalizer frame in both directions may next be given.

Meshing with the gear wheels 13 are pinions 21 mounted upon a shaft 22 which are adapted to operate pinions 23 one of which is secured to each of the totalizer wheels 24. The totalizer and its transfer mechanism are mounted in a swinging frame 351 which is pivoted upon a shaft 25 (Figs. 2 and 4) and is rocked to bring the totalizer pinions 23 into engagement with the pinions 21 upon the manipulation of any one of the amount levers by camming edges 26 of said amount levers engaging an antifriction roller 27 mounted on a frame 29. Meshing with the gear wheel 13 of the clerk's initial lever 11 is a pinion 30 (see Fig. 4), secured to a shaft 31. This shaft has mounted upon its other end (see Fig. 9), a notched disk 32 upon the periphery of which rides a pin 33 secured to the forward end of a U shaped arm 34 pivoted at 35 to the totalizer frame. Between the rearward end of the arm 34 and the rear edge of the frame 29 is interposed a spring 36 which tends to force a projection 37 of the arm 34 into engagement with the notch 38 cut in the hub of the frame 29, but such engagement is normally prevented by disk 32. From this description it will be clearly seen that as soon as the initial lever 11 is manipulated the disk 32 will be rotated to bring its notch into alinement with the pin 33 of the arm 34 after which the spring 36 will force the projection 37 into engagement with the notch 38 thereby connecting the counter frame with the frame 29 so that they now move as one piece. It may be noted that as shown the initial lever 11 has two possible extents of movement, as the device is constructed for two clerks only. If more lever positions were desired the cut away part of disk 32 would be lengthened to include a larger portion of the whole periphery. When one of the amount levers 10 is now given a small initial movement the frame 29 will be rocked through roller 27 and will carry the totalizer frame with it to bring the totalizer pinions 23 into engagement with the pinions 21. By continuing the movement of the amount levers the totalizer will be actuated during which actuation the transfer mechanism may be tripped as will be described later.

Figures 9, 11:
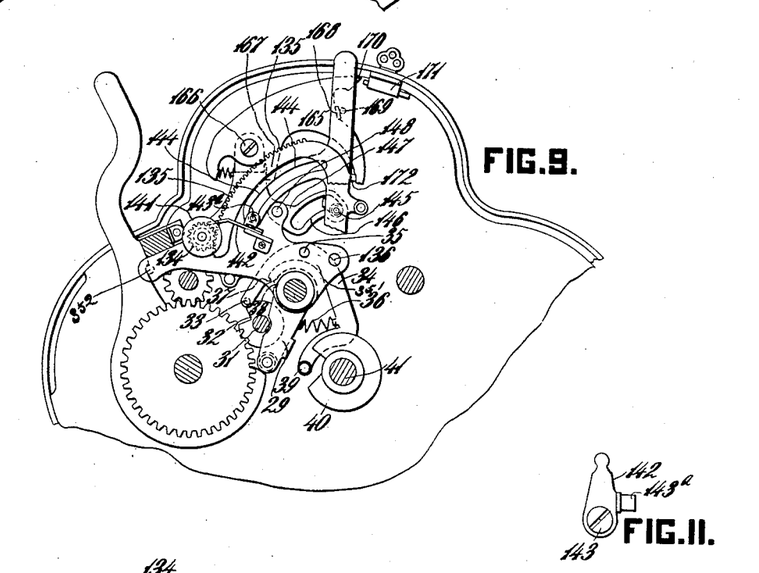
Fig. 9 is a partial vertical transverse section through the machine showing the turn to zero device.
Fig. 11 is a detail view of part of the mechanism for shifting the totalizer shaft.

As shown in Figs. 4 and 9 the totalizer frame 351 is provided at its forward end with a cross bar 352 directly in the rear of and normally engaging all the amount levers 10. The function of this bar 352 is to cause a preliminary movement of all the other amount levers when any one of them is moved. It will be remembered that the totalizer frame is rocked into mesh by the first movement of any amount lever, but this first movement causes a slight rotation of the corresponding intermediate pinion 21, and the teeth of totalizer pinions 23, if positioned to mesh with the teeth of intermediates 21 after these intermediates have had a slight movement, would clearly be out of position to mesh readily with the teeth of other intermediate pinions, if these remained in normal position. By the provision of cross bar 352 normally engaging all amount levers 10, this objection is obviated, as the bar will, as the totalizer frame 351 is rocked by movement of any amount lever 10, give a slight movement in union with such movement, to all the other amount levers 10, thereby bringing the teeth of the corresponding intermediates 21 into position to mesh properly with the totalizer pinions 21.

The rearward end of the arm 34 has mounted thereon an antifriction roller 39 which when said arm is rocked is moved into the path of a cam 40 mounted upon a rotation shaft 41. When the rotation shaft 41 is rotated during the operation of the machine the cam 40 acting upon the antifriction roller 39 and rocks the arm 34 thereby disengaging the projection 37 from the notch 38 of the frame 29 after which the totalizer frame will be rocked to its normal position by a cam 41ª (see Fig. 4) secured to the shaft 41 which engages and rocks an arm 42ª rigid with the totalizer frame. The totalizer being thus moved out of engagement with its actuating pinions leaves the amount levers free to be returned to their normal position by mechanism which will next be described. A locking lever 54 is provided which forms a part of the frame 29 and projects into a notch of a disk 55 secured to the main rotation shaft 74. This will lock said shaft from rotation until one of the amount levers has been operated to rock the frame 29 and withdraw the lever 54 from the notched disk 55.

Extending upwardly from the rear ends of the rack bars 16 are projections 42 (see Fig. 4) which are adapted to be engaged by a swinging rod 43 which is carried by two arms 44 pivoted upon a shaft 45 and which has mounted upon a forward extension thereof an antifriction roller 46 adapted to be engaged by a cam 47 secured to the rotation shaft 41. Near the end of the operation the cam 47 engages the antifriction roller 46 and positively rocks the lever arms 44 around pivot 45 whereupon the rod 43 connecting said arms, engages the projections 42 of the rack bar 16 and positively restores all of said rack bars to normal position. The arms 44 are shown in their normal position in Fig. 4, and it will be seen that the rack bars are free to move forward to any desired extent, but in all cases will be restored to their zero position together with the main levers and the intermediate parts which set the rack bars. This mechanism is so timed that the restoring movement will be commenced immediately after the printing has taken place.

Figure 2:
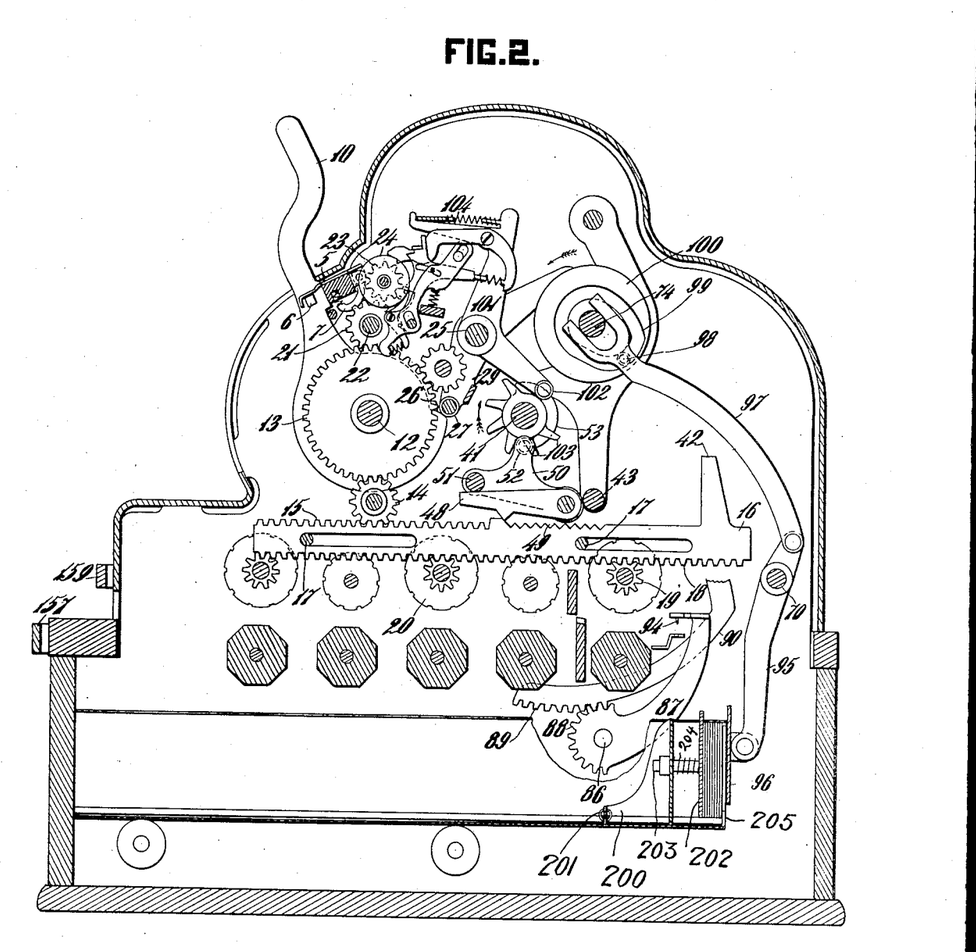
Fig. 2 is a vertical transverse section through the machine between the units and tens of cents bank.

An alining and locking device for the rack bars 16 is shown in Fig. 2 and consists of a series of arms 48 each having an alining tooth extending downwardly from the lower edge thereof and adapted to engage a series of alining teeth 49 upon the rack bars 16. Pivoted on the same shaft with the alining arms is a frame consisting of two arms 50 connected by a rod 51 which extends over all of the arms 48. One of the arms 50 has an upwardly extending portion which carries an antifriction roller 52 which is engaged by a cam 53 on shaft 41 immediately after the shaft 41 begins to rotate and forced downwardly, thereby locking the racks bars 16 in their set positions during the printing operation. As soon as the impressions have been taken the rack bars are unlocked and then restored to normal position.

It was previously stated that five sets of printing devices are provided and these are best shown in Figs. 3 and 4. Certain of the sets include type wheels driven from the rack bars 16 and all of the sets are provided with inking pads positioned to engage and ink the type at each operation of the machine. To take impressions from the type carriers, a platen frame is provided having five platen devices mounted thereon and arranged to be forced up against the type carriers by a toggle connected to the main operating mechanism up against the type carriers. The platen frame carries a movable knife adapted to pass closely by a stationary knife blade, whereby the filing card is separated into two portions, one portion of which forming a stub is arranged to be retained in the machine.

Referring to Fig. 3 it will be seen that all of the platens 60 are carried by a frame 61 and are each provided with a spring bearing. The frame 61 is carried by two arms 62 which are pivoted on pins 63 and are connected to toggle links 64 and 65. Connected to the center point of these toggles at 66 and 67 is a reciprocating bar 68 which is operated twice at each actuation of the machine to provide for the inking and printing movements. The operating means therefor consists of an arm 69 pivoted on a pin 70 and connected by a pin and slot connection to the rearward end of the reciprocating link 68. An antifriction roller 71 is mounted in the upper end of the arm 69 and is adapted to be operated by a cam slot 72 in a cam disk 73 mounted upon the main rotation shaft 74. The configuration of the cam groove 72 is such that the platens 60 will be elevated slightly to force a series of inking pads 75 against the type wheels to ink the same after which said platens will be lowered again to permit said ink pads 75 to be restored to their normal position following which the platens will again be elevated, but to a greater extent than before to force the materials to be printed upon upward against the type wheels and take an impression therefrom.

Mounted in the frame work of the machine between the fourth and fifth sets of type wheels is a stationary knife 76 and mounted in the frame 61 is another knife blade 77 which when said frame is elevated the second time will coöperate with the stationary knife blade 76 and will sever a duplicate slip which has been printed by the fifth set of type wheels. The first movement of the impression frame is not great enough to cause the knife blades to contact.

The inking mechanism consists of a series of arms 78 which are pivoted upon the shafts of the type wheels and carry at their outer ends spring pressed arms 79 having at their outer ends the inking pads 75. The movement of the arms 79 is limited in one direction by a series of lugs 80 extending from the outer ends of the arms 78 under a printing wheel supporting frame. All of the arms 78 are pivotally connected to a reciprocating bar 81 which is operated by a slotted arm 82 (see Figs. 3 and 6), which is pivoted loosely upon the shaft 41 and carries at its upper end an antifriction roller 92 adapted to ride in a cam groove 84 of a cam disk 85 secured to the shaft 74. The configuration of the cam groove 84 is such that during the first part of the rotation of the shaft 74 the inking pads 75 will be brought into inking position. After the inking of the type wheels by the first elevation of the platens 60 has taken place, the inking pads 75 are returned to their normal positions.

The duplicate slips or vouchers, as before explained, are deposited in a drawer which is situated beneath the printing platens after being cut off by the knives. For the purpose of depositing these slips in the drawer in regular order the following mechanism is employed (see Fig. 2). Pivoted on a pin 86 is an arm 87 which is provided with gear teeth 88 meshing with gear teeth 89 of a segmental arm 90 which is pivoted on a pin 91 (see Fig. 3) and has mounted in its upper end an antifriction roller 92 adapted to be engaged and operated by cam groove 93 in the cam disk 73. The arm 87 is provided at its upper end with downwardly extending pin points 94 which are adapted to pierce the duplicate slip at the second upward movement of the platen 60. The drawer is provided with a spring partition slidably mounted therein consisting of a slide 200 having rollers 201, by which it is supported in the drawer, and a plate 202 resiliently carried by the slide by a rod 203 and spring 204. The rear end of the drawer is open except for a small flange 205 which serves to prevent slips from falling out of the drawer but the slips may be pushed into the drawer from the rear the same merely bending when passing flange 205. The consequence of this construction is that when slips are pushed into the drawer, the spring 204 gives enough to allow the operation and then returns the slip so that they are held compactly between the plate 202 and flange 205 while the slide 200 is moved but slightly as required to make room for the extra slip. Pivoted upon the shaft 70 and extending downwardly is an arm 95 (see Fig. 2) to the lower end of which is pivoted a plate 96. The arm 95 is operated by the link 97 which straddles the shaft 74 and is provided with an antifriction roller 98 adapted to be engaged by the cam groove 99 of a cam disk 100.

The operation of the stub carrying mechanism is as follows: As soon as the operation of the machine is commenced, the platens are raised to take an impression from the type carriers and by the rocking of the lever 95, the plate 96 is carried rearwardly leaving a space between the same and the previously deposited voucher. When the platens are elevated, the pins 94 will be forced through the stub of the filing card so that when the platen again descends the stub will remain elevated being held by the said pins. During the further operation of the machine, the lever arm 90 carrying the segment rack 89 is rocked, thereby rocking the arm 87 around its pivot 86 and carrying the stub down into the rear of the previously placed stub, though in front of the plate 96. The plate is then again moved forwardly to force the slip from the pins 94 and into the rear end of the drawer which retains the slips after they have been deposited. Lastly the arm 87 is returned to its normal position.

It was previously stated that the operation of the totalizer takes place as the amount levers are moved from their zero position. It might easily happen that a careless operator would move an amount lever one or more steps too far and this might in certain cases cause a tripping of the transfer device. In the present mechanism the transfer is not finally carried to the next higher wheel until the movement of the operating handle is given so that it is practicable to provide devices for restoring a tripped transfer pawl by a rearward or reverse movement of the totalizer element. Mechanism is provided to accomplish this function, as will be later described. The transfer employed is a variation of a known type wherein the tripping of the transfer pawls is accomplished by the movement of the totalizer elements, but wherein the actual operation of the transfer pawls to carry the transfers is performed by the operating handle after the amount setting elements have completed their operation.

Figure 7:
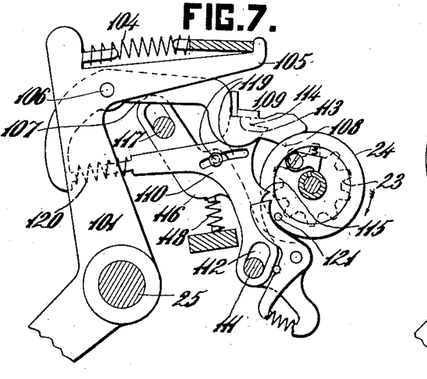
Fig. 7 is a detail section through the totalizing device with the transfer mechanism in normal position.
Figure 8:
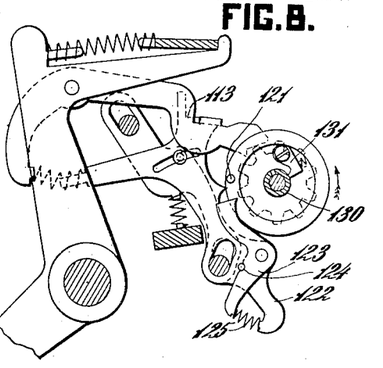
Fig. 8 is a detail section through the totalizing device showing the transfer mechanism in tripped position.

Referring to Figs. 2, 7 and 8 the transfer operating levers 101 are pivoted loosely upon the shaft 25 and have mounted upon their lower ends antifriction rollers 102 which at each operation of the machine will be rocked by a series of cams 103 helically arranged around the shaft 41. As the transfer mechanism is the same for each bank, a single mechanism only will be described for the sake of convenience. Between the upper end of the lever 101 and the totalizer frame is interposed a spring 104 which tends to hold the antifriction roller 102 against the periphery of the transfer cam 103 being limited in such movement, however, through the medium of a forwardly projecting arm 105 of the lever 101. Pivoted at 106 to the lever 101 is a transfer arm 107 which has an operating tooth 108 at its forward end, adapted when said arm is lowered to engage and operate the totalizer pinion. Extending laterally from the arm 107 is a lug 109 which is adapted to be engaged and held in elevated position by a transfer trip pawl 110, pivoted upon a rod 111 and having at said pivotal point an elongated slot 112 to allow a recocking movement of said transfer pawl as will hereinafter be pointed out. The pawl 110 is provided with two notches 113 and 114 and an operating projection 115 and is held in its upper position by a rocking bar 116 which is mounted upon the rod 111 and the rod 117 and which has an elongated bearing. This bar 116 is spring pressed to its normal position, (see Fig. 7) by a spring 118 and through a pin and slot connection 119 holds the trip pawl 110 in its normal position. Between a rearward extension of the trip pawl 110 and a downwardly extending heel of the transfer arm 107 is a spring 120 which holds the lug 109 of the arm 107 into engagement with the notches 113 and 114.

The operation of the above described mechanism is as follows: When the amount lever 10 is pulled downwardly the totalizer wheel will be rotated in the direction of the arrow (see Fig. 7) and cause the transfer pin 121 mounted on said wheel to engage the operating projection 115 of the trip pawl 110 as soon as the counter wheel has been moved to register more than 9. This will cause the pawl 110 to be rocked rearwardly around rod 111 to an extent sufficient to permit the lug 109 of the arm 107 to drop into the notch 114 of said pawl, thereby bringing the tooth 108 of the arm 107 into position to operate upon the totalizer pinion 23 and advance the totalizer wheel forward one step when the lever 101 is operated. This position of the parts is shown in Fig. 8.

To provide for the recocking of the transfer pawls, as above referred to, the bar 116 has a downward extension 122 upon which is pivoted a rocking arm 123 having its movement limited in one direction by a stop pin 124 on bar 116 and spring pressed against said pin by the spring 125. This mechanism is for the purpose of recocking a tripped transfer device in case it is desirable to return the operated lever 10 for any purpose, as for example, if the operator moves a lever 10 farther than was desired. In Fig. 8 the transfer mechanism is shown in tripped position and if at this time the totalizer wheel is reversely rotated in the direction of the arrow in said figure the trip pin 121 will strike the upper end of the recocking pawl 123 and will through the bar 116 and pin and slot connection 119 lower the trip pawl 110 until the notch 113 thereon is below the lug 109 on transfer pawl 107 when the pawl 110 will be forced forwardly by the spring 120 to bring the notch 113 under the lug 109. The transfer pawl 107 is prevented from moving downward with the trip pawl 110 as the forward edge of said transfer pawl rests on the totalizer wheel gear. At the end of the movement the pin 121 passes free from the upper end of the pawl 123 and the spring 118 will force the bar 116 and pawls 110 and 123 upward to their normal positions, thereby rocking the arm 107 out of operative relation with the totalizer pinion 23. During the regular forward movement of the totalizer wheel, the pin 121 wipes idly by the pawl 123. It will be seen from this construction that the object previously stated is very simply and successfully attained thereby. In ordinary operations of the machine this transfer recocking mechanism performs no function, but in case an inadvertent extra movement of the setting element is given and a mistaken tripping of the transfer pawl thereby takes place, the mistake may be remedied very easily by a reverse movement of the setting lever. This reverse movement will cause a simple reverse movement of the totalizer element and the pin 121 will engage pawl 123 forcing the same downwardly and permitting a restoration of the transfer pawl to its normal inoperative position.

The totalizer elements are all loosely journaled on a shaft, the rotation of which is utilized to restore the totalizer wheels to normal zero position. Ordinarily the supporting shaft does not rotate at all, but when it is desired to reset the totalizer, a shaft inside the supporting sleeve of the totalizer elements is moved longitudinally enough to permit spring pawls carried by the totalizer elements to engage a slot in the sleeve. A succeeding rotation of the sleeve will cause the pawls to engage the slot therein and carry the totalizer elements back to their normal zero position, and this rotation is provided by connecting it to the main operating devices of the machine.

Figure 10:
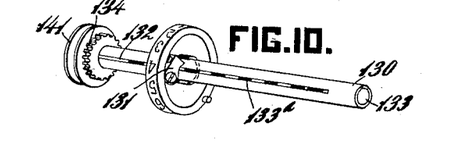
Fig. 10 is a detail perspective view of the totalizer, shaft and sleeve.
Figure 12:
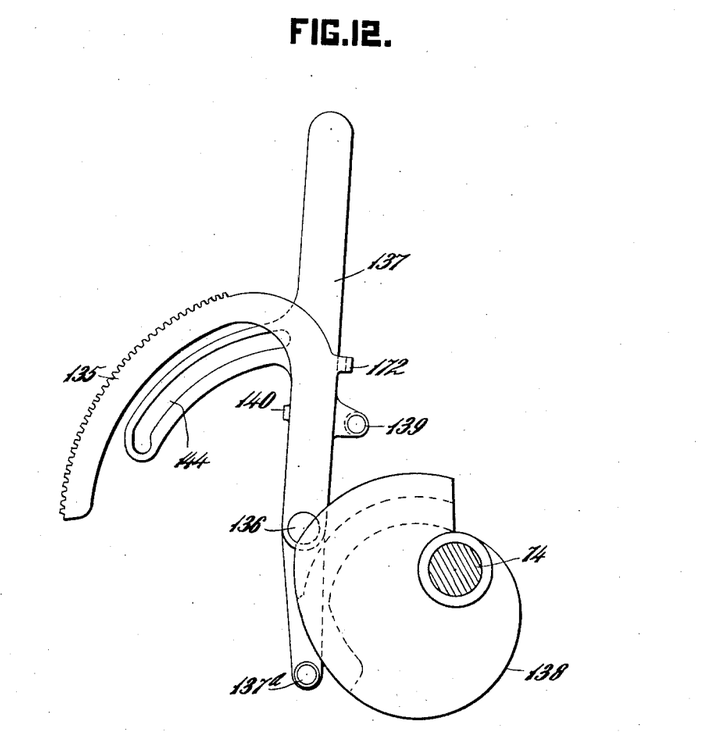
Fig. 12 is a detail view of the turn to zero operating means.

The totalizer wheels are loosely mounted upon a sleeve 130 (see Figs. 8 and 10) and are provided with spring turn to zero pawls 131 bearing on the periphery of said sleeve. This sleeve is slotted at 132 and surrounds a sliding shaft 133 which has a series of lugs 133$^a$ projecting therefrom into the slot 132 of said sleeve and flush with the periphery thereof. When the shaft 133 is in its normal position the lugs 133$^a$ of said shaft are in the path of movement of the pawls 131 so that the totalizer wheels may be rotated in either direction without their pawls 131 engaging in the slot 132 of the sleeve 130. When it is desired to turn the totalizer to zero the shaft 133 is shifted for the purpose of moving the lugs 133$^a$ of said shaft out of the path of movement of the pawls 131 and by permitting said pawls to drop into engagement with the slot 132 of the sleeve 130, when said sleeve is rotated, the rotation will carry all the totalizer wheels to their zero position. In order to shift said shaft 133 and to rotate sleeve 130 whereby to cause the setting to zero of the totalizer the following mechanism is employed. Mounted on one end of the shaft 133 is a flanged disk 141 between the flanges of which operates the round head of an arm 142 (see Figs. 9 and 11) pivoted at 143 to the frame work of the machine. Said arm 142 has an ear bent upward from one of its sides and this ear is provided with an antifriction roller 143$^a$ adapted to be engaged and operated by a cam slot 144 cut in a downwardly and forwardly curved arm of a lever 137 pivoted at 136. Said lever has attached to its lower end an antifriction roller 137$^a$ which is operated by a cam 138 fast to the shaft 74. Mounted upon one end of the sleeve 130 is a gear pinion 134 which is operated by a segmental toothed arm 135 also pivoted at 136.

The arm 135 is operated by a pin 139 mounted upon the lever 137 which is adapted after a slight initial movement of said lever to engage the edge of the segmental toothed arm 135 and operate the same to turn the totalizer to zero. The arm 135 is returned to normal position by a lug 140 of the lever 137 operating against the forward edge of said arm. The lever 137 extends upward through the casing, and is adapted to be given a slight manual movement by the operator, and during this initial manually operated movement of said lever the antifriction roller 137ª is moved into operative relation with the cam 138 and through the cam slot 144, roller 143ª, arm 142 and flange 141 the shaft 133 is shifted.

Mounted at 145 on the lever 137 (see Fig. 9) is an antifriction roller which operates in a slot 146 of a lever 147 secured to a shaft 148. This shaft has mounted thereon an arm 149 (see Fig. 4) having a rod mounted in its forward end which underlies all of the transfer arms 107 and when the shaft 148 is rocked by the initial movement of the lever 137 said rod will be elevated to the lower edge of said transfer arms to keep them from dropping into operative relation with the totalizer pinions 23 during the turn to zero operation. Also mounted on the shaft 148 is a downwardly extending arm 150 having a pin and slot connection with a bell cranked lever 151 pivoted upon the shaft 25. This arm extends under the pin 152 on the side of the locking arm 54 and will elevate said arm to unlock the machine when the shaft 148 is rocked, thus producing the unlocking effect of an operation of an amount lever.

The table 155 (see Fig. 1) is mounted upon rollers 156 which travel upon a track 157. A paper clip 158 is pivoted to the table and has a projection 159ª which is operated by the end of a track 159. When said table is started toward the machine the clip 158 will be swung downward and the track 159 will hold it in this position until said table is returned to its outer position. During the first degree of inward movement of the table the inner edge of said table will contact with a shoe 160 of a lever 161 (Fig. 4) and will rock said lever 161 enough to remove its upper end out of the path of movement of a locking pin 162 which is secured to the disk 41ª on the shaft 41.

The lever 137 and arm 135 are provided with a lock to prevent frictional movement of the turn to zero mechanism during registering operations. Said lock consists (Fig. 9) of a plate 165 pivoted at 166 on the totalizer frame. Said plate is limited in its movement in one direction by a projection 167 which abuts against the totalizer frame. A projection 168 extends laterally from said plate into the path of movement of a pin 169 mounted upon the side of the lever 137. A beveled portion 170 is adapted to be engaged by the bolt of an ordinary lock 171 to elevate the plate 165 out of the path of pin 169 and thereby unlock the lever 137. The projection 172 of the segmental toothed arm 135 is engaged by a downwardly projecting arm of the plate 165 so that while said plate is in locking position the arm 135 will be held against backward movement. Forward movement of the arm 135 is prevented by the lug 140 of the lever 137. This lock prevents unauthorized persons from turning the counter to zero.

While the form of mechanism herein shown and described is admirably adapted to fulfil the objects primarily stated, it is to be understood that it is not intended to confine the invention to the one form of embodiment herein shown and described as it is susceptible of embodiment in various forms all coming within the scope of the claims which follow.

What is claimed is:

1. In a cash register, the combination with a totalizing mechanism, of a series of manipulative devices for operating said totalizing mechanism, a special manipulative device, means under control of said special manipulative device and operated by an initial movement of any one of the manipulative devices for causing the totalizing mechanism to be moved into position to be operated by a continued movement of said manipulative devices, and for preventing any movement of the said series of manipulative devices until the special manipulative device has been moved from normal position.

2. In a cash register, the combination with a totalizer and an operating mechanism therefor, of a series of manipulative devices for operating said totalizer, a special manipulative device, a lock for the operating mechanism, means under control of said special manipulative device and operated by an initial movement of any one of the other manipulative devices for unlocking the operating mechanism and causing the totalizer to be moved into position to be operated by a continued movement of said manipulative devices and a restoring means for said totalizer.

3. In a cash register, the combination with a totalizing mechanism, of a series of amount determining elements for operating said totalizing mechanism, a special setting element, means operated by an initial movement of any one of the amount determining elements for positioning the totalizing mechanism to be operated by a continued movement of said amount determining elements, means intermediate the special setting element and the amount determining elements for preventing any movement of the amount determining elements until the special setting element has been moved from normal position.

4. In a cash register, the combination with a totalizing mechanism, of a series of amount determining elements, a special setting element, means under control of said special setting element and operated by an initial movement of any one of the amount determining elements for positioning the totalizing mechanism to be operated, and automatic means for giving the unoperated amount determining elements an initial movement before the totalizing mechanism is operated.

5. In a cash register, the combination with a totalizing mechanism, of a series of manipulative devices for operating said totalizing mechanism, a special manipulative device, means intermediate the manipulative devices and the totalizing mechanism under control of said special manipulative devices and operated by an initial movement of any one of the other manipulative devices for causing the totalizing mechanism to be moved into position to be operated by a continued movement of said manipulative devices, automatic means for restoring the manipulative devices, a main actuator, and means operated by said main actuator for disabling the intermediate means before the automatic restoring means for the manipulative devices operate.

6. In a cash register, the combination with a totalizer, of a plurality of amount determining devices for actuating said totalizer, a special differentially adjustable device, an intermediate means consisting of two elements, one element operated by the special differentially adjustable device and the other element by the amount determining devices for causing the totalizer to be moved to a position to be actuated by said amount determining devices, and separate restoring means for each of the two elements.

7. In a cash register, the combination with a totalizer, of operating means for said totalizer, a transfer device for the totalizer, a tripping means for preparing said transfer device for operation, and a recocking device for the tripping means operated if the totalizer operating means is retrogressively moved before the transfer device is operated.

8. In a cash register, the combination with a totalizer and an operating device therefor, a transfer device for said totalizer, a turn-to-zero device having a shiftable member for preparing said totalizer for the turn-to-zero movement and a rotatable member for turning the totalizer to zero, a main actuator and locking means for said actuator, a setting means for the turn-to-zero device having an initial movement which operates the shiftable member, disables the transfer device, operates the locking means for the main actuator and moves said setting means into operative relation with the main actuator and means for operating said main actuator for completing the excursion of movement of the setting means to operate the rotatable member of the turn-to-zero device.

9. In a cash register, the combination with a totalizing mechanism, of a series of manipulative devices for operating said totalizing mechanism, a special manipulative device, means under control of said special manipulative device and operated by an initial movement of any one of the manipulative devices for causing the totalizing mechanism to be moved into position to be operated by a continued movement of said manipulative devices, a printing device controlled by the manipulative devices, a shiftable paper carrying device for carrying paper into position to be printed, a paper severing device, a receptacle for receiving the severed portions of the printed paper and means for depositing said severed portions in said receptacle.

10. In a cash register, the combination with totalizer wheels, of transfer pawls for said wheels, devices for supporting said pawls and constructed to be withdrawn by the totalizer wheels, and pawls carried by said supporting devices for depressing the same by reverse movement of said wheels.

11. In a cash register, the combination with totalizer wheels, of transfer devices for actuating said wheels, trip devices normally preventing effective operation of said transfer devices constructed to be withdrawn from said transfer devices by said totalizer wheels, and means whereby the totalizer elements may be reversely moved when desired to restore said trip devices.

12. In a cash register, the combination with totalizer wheels, of transfer mechanism therefor normally ineffective, means controlled by said totalizer wheels for permitting effective actuation of said transfer mechanism, and devices actuated only by reverse movement of said totalizer wheels for restoring said transfer mechanism to its normal ineffective condition.

13. In a cash register, the combination with a main operating mechanism, of totalizer wheels, a shaft having projections, a slotted sleeve surrounding said shaft, a lever and connections which when operated shift said shaft axially and then rotate said sleeve and shaft, and means controlled by the main operating mechanism for automatically completing the operation of said lever and connections after a preliminary partial operation thereof.

14. In a cash register, the combination with a main operating mechanism, of totalizer elements, a slotted sleeve supporting said elements, a shaft inside said sleeve having projections in said slot, pawls carried by said totalizer elements, a hand operated device and connections which when operated first shift said shaft axially and then rotate said sleeve and shaft, and means controlled by the main operating mechanism for automatically completing the operation of said lever and connections after a preliminary partial operation thereof.

15. In a cash register, the combination with totalizer elements, of a main operating mechanism, a shaft supporting said totalizer elements, a hand lever and connections for rotating said shaft, and means connected to said operating mechanism for actuating the lever after the same has been manually started.

16. In a cash register, the combination with an operating mechanism, of a lock therefor, a totalizer, a series of amount determining devices for said totalizer, and means operated by movement of an amount determining device for unlocking the operating mechanism and causing the totalizer to be moved into position for being operated.

17. In a cash register, the combination with an operating mechanism, of a lock therefor, a totalizer, a series of amount determining devices for said totalizer, a special manipulative device, means operated by movement of an amount determining device for unlocking the operating mechanism, and causing the totalizer to be moved into position to be operated, and means controlled by the special manipulative device for preventing operation of said amount determining device.

18. In a cash register, the combination with totalizer wheels, of transfer devices for said wheels, and means for making said transfer devices effective by forward rotation of the totalizer wheels and ineffective if the totalizer wheels are backwardly rotated from one indicating position past transfer effecting position to another indicating position after the transfer devices have been made effective.

19. In a cash register, the combination with type-carriers, of means for differentially setting the same, a platen, a paper cutting device, a stub carrying device, means for operating the platen and cutting device arranged to deliver stubs to the carrying device, a stub filing receptacle, a spring pressed slide in said receptacle, a stub pushing device mounted in line with the slide, means for operating the carrying device to carry stubs between the slide and pushing device, and means for operating the pushing device for the purpose of detaching stubs from the carrying device and forcing the same against said slide in the order in which they are delivered by the carrying device.

20. In a cash register, the combination with printing mechanism, of means for operating the same, a filing receptacle, a slide in said receptacle, a pushing device coacting with the slide, means for carrying slips from the printing mechanism between the slide and pushing device, means for operating the pushing device, and means for retaining slips against said slide independently of the pushing device.

21. In a cash register, the combination with printing mechanism, of means for operating the same, a filing receptacle, a slide in said receptacle, a plate resiliently carried by the slide, a pushing device coacting with the said plate, means for carrying slips from the printing mechanism between said plate and the pushing device, and means for operating the pushing device.

22. In a receipting recorder, a case, operating means, and an indicating totalizing counter mounted in said case comprising number wheels, a pinion fast on each number wheel, a transfer setting stud on said number wheels, a transfer setting element independently actuated by each of said studs, and a transfer effecting element for each of said transfer setting elements adapted to engage said pinions successively and independently of one another, whereby each number wheel may be set back and forth at will and in any order or at random and the transfers of tens are properly registered and a true total of all transactions so registered attained and indicated.

23. In a cash register the combination with totalizer elements; of transfer members; means for preparing the members for operation to effect transfers, when the totalizer elements are moved from their nine to their zero position in one direction and for rendering the transfer members inoperative for such purpose if the totalizer elements are moved from their zero to their nine position in the reverse direction.

24. In a cash register the combination with totalizer elements; of transfer devices for the totalizer elements; means for preparing the transfer devices for operation to effect transfers when the totalizer elements are moved to a position requiring a transfer, and for rendering the transfer devices inoperative when the totalizer elements are retrogressively moved.

25. In a cash register the combination with totalizer elements; of transfer devices for the totalizer elements; trip devices for rendering the transfer devices effective when the totalizer elements are moved to positions requiring transfers; and means for making inoperative the transfer devices which have been rendered effective before the transfer devices are operated.

26. In a cash register the combination with totalizer wheels; of operating means therefor; transfer pawls for said wheels; devices for supporting said pawls and constructed to be withdrawn by the totalizer wheels; and pawls carried by said supporting devices for depressing the same by reverse movement of said operating means.

27. In a cash register the combination with a main operating mechanism; of printing mechanism; a filing receptacle; a pivoted arm adapted to seize slips printed by the printing mechanism and adapted to be oscillated by said operating mechanism to consecutively file the slips in a vertical position in the filing receptacle; and means actuated by said operating mechanism whereby the slips are moved forward as each slip is filed.

28. In a cash register the combination with a printing mechanism; of operating means therefor; a filing receptacle; a pivoted member adapted to seize slips printed by said printing mechanism; and an actuating element for said pivoted member operated by said operating means to cause the pivoted member to seize the slips and file them consecutively in said receptacle.

29. In a cash register the combination with a printing mechanism; of operating means therefor; a filing receptacle constructed to retain slips printed by the printing mechanism in a vertical position; a pivoted member adapted to seize the slips; and actuating means operated by said operating means to cause the pivoted member to seize and consecutively file said slips in a vertical position in said receptacle.

30. In a cash register the combination with a printing mechanism; of operating means for the same; a file receptacle; a slide in said receptacle; a plate operated by said operating means; and a device adapted to carry slips which have been printed from the printing mechanism, and actuated by said operative means to consecutively file the slips between said slide and said plate.

31. In a cash register the combination with a plurality of type carriers; of manipulative devices for operating the same; operating means; inking pads for the type carriers; connections from the operating means to said inking pads for moving said pads into position to be actuated for inking the type; a corresponding number of platens yieldingly mounted on a carrying frame; and connections between said operating means and said frame, including a member and links connecting said member and said platen carrying frame for giving the platen two extents of movements whereby the ink pads are actuated to ink the type and an impression from said type is taken on record material.

32. In a cash register the combination with a plurality of type carriers; of an actuating rack employed to differentially position said type carriers; a platen for each type carrier; operating means for giving said platens extents of movements common to all whereby impressions may be taken on record materials; a projection on said rack and a pivoted member actuated by said operating means and adapted to engage said projection whereby said rack is finally restored to normal position.

33. In a cash register the combination with an operating mechanism; of two locking devices therefor; a totalizer; a series of amount determining devices for operating said totalizer, and means operated by movement of an amount determining device for rendering one of the locking devices ineffective and causing the totalizer to be moved into position for being operated; a printing mechanism; and a sliding device for carrying the record material to be printed and rendering the other locking device ineffective.

34. In a machine of the class described the combination with totalizer elements and a pivoted frame for supporting the same; of amount determining manipulative devices for operating said totalizer elements; a pivoted member operated by said manipulative devices; an element employed to rigidly connect said supporting frame and said pivoted member; and a special manipulative device controlling said connecting element, whereby movement of said special device renders said connecting element effective and subsequent movement of one of said amount determining manipulative devices causes the totalizer to be moved into position for being operated.

35. In a cash register the combination with a totalizer; of a series of amount determining manipulative devices carrying projections; a special manipulative device carrying a projection; a pivoted member; locking elements carried by said pivoted member and adapted to engage the projections on said amount determining devices and lock the same from movement; and a member projecting from said pivoted member adapted to be engaged by the projection on said special manipulative device and so constructed that operation of said special manipulative device takes the locking elements out of engagement with the projections on the amount determining manipulative devices.

36. In a cash register, the combination with totalizer elements, of transfer devices for actuating said elements, trip devices normally holding said transfer devices in ineffective condition, and means carried by the transfer elements for tripping said trip devices when said elements are moved in one direction and restoring any trip devices previously tripped when moved in a reverse direction.

37. In a cash register, the combination with totalizer elements, of normally ineffective transfer mechanism therefor, and means under control of said elements for rendering said transfer mechanism effective during movements of said elements in one direction and restoring an effective transfer mechanism to ineffective position during movements of the elements in a reverse direction.

In testimony whereof I affix my signature in the presence of two witnesses.

JOSEPH P. CLEAL.

Witnesses:
 WILLIAM W. BATESON,
 D. S. TOVELL.

DISCLAIMER.

1,118,104.—*Joseph P. Cleal*, Toronto, Ontario, Canada. REGISTERING AND RECORDING MACHINE. Patent dated November 24, 1914. Disclaimer filed August 11, 1926, by the assignee by mesne assignments, *The National Cash Register Company*.

Hereby disclaims any structure which falls within that part of claim 35, which reads: "a series of amount determining manipulative devices carrying projections; a special manipulative device carrying a projection; a pivoted member; locking elements carried by said pivoted member and adapted to engage the projections on said amount determining devices and lock the same from movement," except one in which the "locking elements" carried by the "pivoted member" engage projections on the "amount determining manipulative devices" to prevent their movement from home position.

[*Official Gazette August 31, 1926.*]